United States Patent [19]

Ramsay et al.

[11] 4,205,901

[45] Jun. 3, 1980

[54] LIMITED MODE OPTICAL FIBER

[75] Inventors: Melvin M. Ramsay, Broxbourne; Philip W. Black, Bishops Stortford, both of England

[73] Assignee: International Standard Electric Corporation, New York, N.Y.

[21] Appl. No.: 948,447

[22] Filed: Oct. 4, 1978

Related U.S. Application Data

[62] Division of Ser. No. 704,146, Jul. 12, 1976, Pat. No. 4,140,505.

[30] Foreign Application Priority Data

Jul. 17, 1975 [GB] United Kingdom ............... 30095/75

[51] Int. Cl.² .............................................. G02B 5/14
[52] U.S. Cl. .................................................. 350/96.31
[58] Field of Search ................ 350/96.30, 96.31, 96.15

[56] References Cited

U.S. PATENT DOCUMENTS

| | | | |
|---|---|---|---|
| 3,877,783 | 4/1975 | Matsumura et al. | 350/96.31 |
| 3,891,302 | 6/1975 | Dabby et al. | 350/96.30 |
| 3,909,110 | 9/1975 | Marcuse | 350/96.15 |
| 4,053,204 | 10/1977 | Miller | 350/96.31 |

*Primary Examiner*—Stewart J. Levy
*Attorney, Agent, or Firm*—John T. O'Halloran; Peter C. Van Der Sluys

[57] ABSTRACT

A single mode optical fiber having a central core region of uniform composition and thickness and core end regions each having a core with a graded composition and increasing thickness towards the ends of the fiber. The fiber maintains a constant normalized frequency with a minimum bending loss. Methods are also provided for forming the fibers from a fiber optic preform.

4 Claims, 3 Drawing Figures

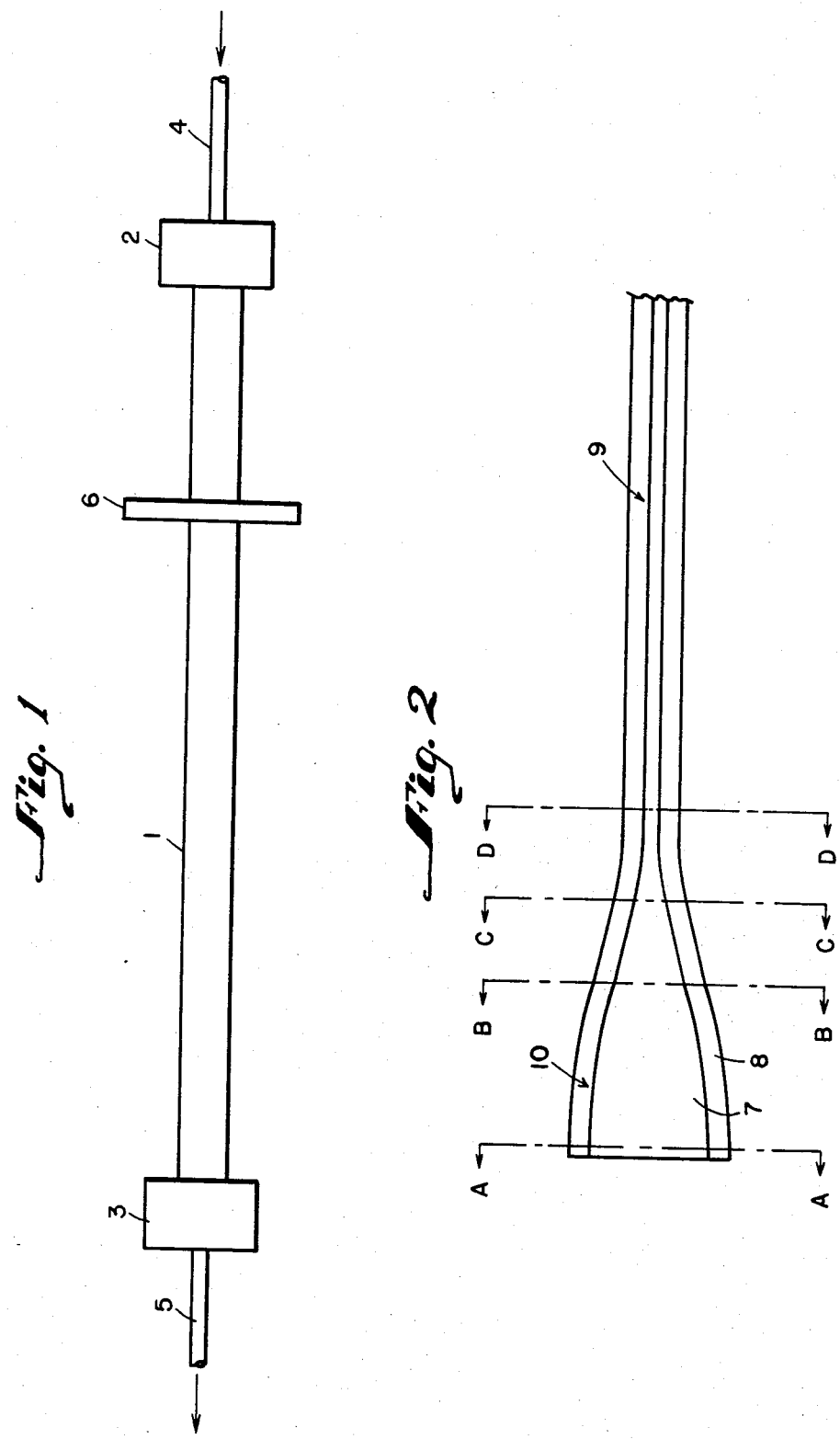

LIMITED MODE OPTICAL FIBER

This is a division of application Ser. No. 704,146, filed July 12, 1976, now U.S. Pat. No. 4,140,505.

BACKGROUND OF THE INVENTION

This invention relates to fiber optic waveguides. One advantage of a singe mode optical waveguide, and a restricted mode guide, over a multimode guide is the elimination or reduction of mode dispersion. A disadvantage is that, for a given core to cladding refractive index difference, the core diameter is smaller than that of a corresponding multimode fiber. A small core presents particular problems in the making of permanent and demountable butt joints between fibers because a lateral displacement of the axis of one fiber with respect to that of the other gives rise to a coupling loss that increases with a reduction in core size. The core diameter can be increased so as to reduce this misalignment problem, but this requires a reduction in the core to cladding refractive index difference. One result is that the mode or modes are less tightly bound to the core, and hence radiative losses at bends in the fiber are increased.

SUMMARY OF THE INVENTION

According to the invention there is provided a method of making a glass optical fiber including the steps of making an optical fiber preform and of drawing the preform into fiber. The core material of the preform is formed by a thermally induced chemical vapor reaction under conditions providing a variation in both core material thickness and core material composition along the length of the preform chosen such that the fiber drawn therefrom has a central core region of substantially constant core thickness and composition and graded core end regions where the core is smoothly graded in thickness and composition to ends having enlarged core thickness. The composition grading is matched with the thickness grading in such a manner as to provide the fiber with a normalized frequency held within limits which provide the central core region and the two graded core end regions with the same single bound non-radiating mode or the same set of bound non-radiating modes. Preferably the grading is such that the normalized frequency is held substantially constant over the three portions of the fiber.

A fiber produced by this method can be designed to combine the advantage of a large cored small refractive index difference fiber so far as coupling efficiently between butt jointed fibers is concerned, while benefiting, over the length of the central portion, which may be very long compared with the graded portion, from the relatively small radiative bending losses of a small cored large refractive index difference fiber.

The refractive index profile of fiber produced by this method may be step-index, graded index, such as a parabolic profile, or a more complex structure, such as the W-guide or O-guide profiles. In all cases the core to cladding refractive index difference for the central region will normally be comparatively large, being typically about 1%, with the result that the transmitted energy is relatively tightly coupled to the core region within this portion. Considering, for illustrative purposes a step index single mode fiber, the normalized frequency (V) is given by:

$$V = 2\pi a (n_1^2 - n_2^2)^{\frac{1}{2}} \cdot \lambda^{-1}$$

where
- $2a$ = core diameter
- $\lambda$ = guided wavelength
- $n_1$ = core refractive index
- $n_2$ = cladding refractive index Substituting
- $n = \frac{1}{2}(n_1 + n_2)$
- and $\Delta n = n_1 - n_2$
gives $V = 4\pi a n^{\frac{1}{2}} \Delta n^{\frac{1}{2}} \cdot \lambda^{-1}$ Then as $\lambda$ and n will remain virtually constant:

$$V \alpha a \cdot \Delta n^{\frac{1}{2}}$$

Thus a parabolic relationship between the core diameter and refractive index difference is required to maintain a constant normalized frequency. Thus, for instance, the core thickness is to be increased by an order of magnitude from about $3\mu$ at the central core region to about $30\mu$ at the ends of the graded core end regions, the refractive index difference must decrease in a corresponding manner by two orders of magnitude, that is from a difference of about 1% to about 0.01%. In principle the grading can be over a distance of no more than a few centimeters, but, in practice, since the fiber is drawn from a preform, and this normally involves an extension of at least a thousand-fold, the grading is longer, and typically extends over several meters or even several tens of meters. Within the graded core end regions the fiber will have the sensitivity to bending losses appropriate to the core size in those regions, but since these graded core end regions will normally represent a very small proportion of the total length of the fiber, the overall sensitivity to bending losses of the fiber considered as a whole will approach the lower limit set by the size of the core in the central core region.

BRIEF DESCRIPTION OF THE DRAWINGS

FIG. 1 is a side view of the apparatus employed in forming the core material of the instant invention.

FIG. 2 is a sectional view of a portion including an end region of an optical fiber manufactured in accordance with the present invention.

DESCRIPTION OF THE PREFERRED EMBODIMENT

Figure 3:
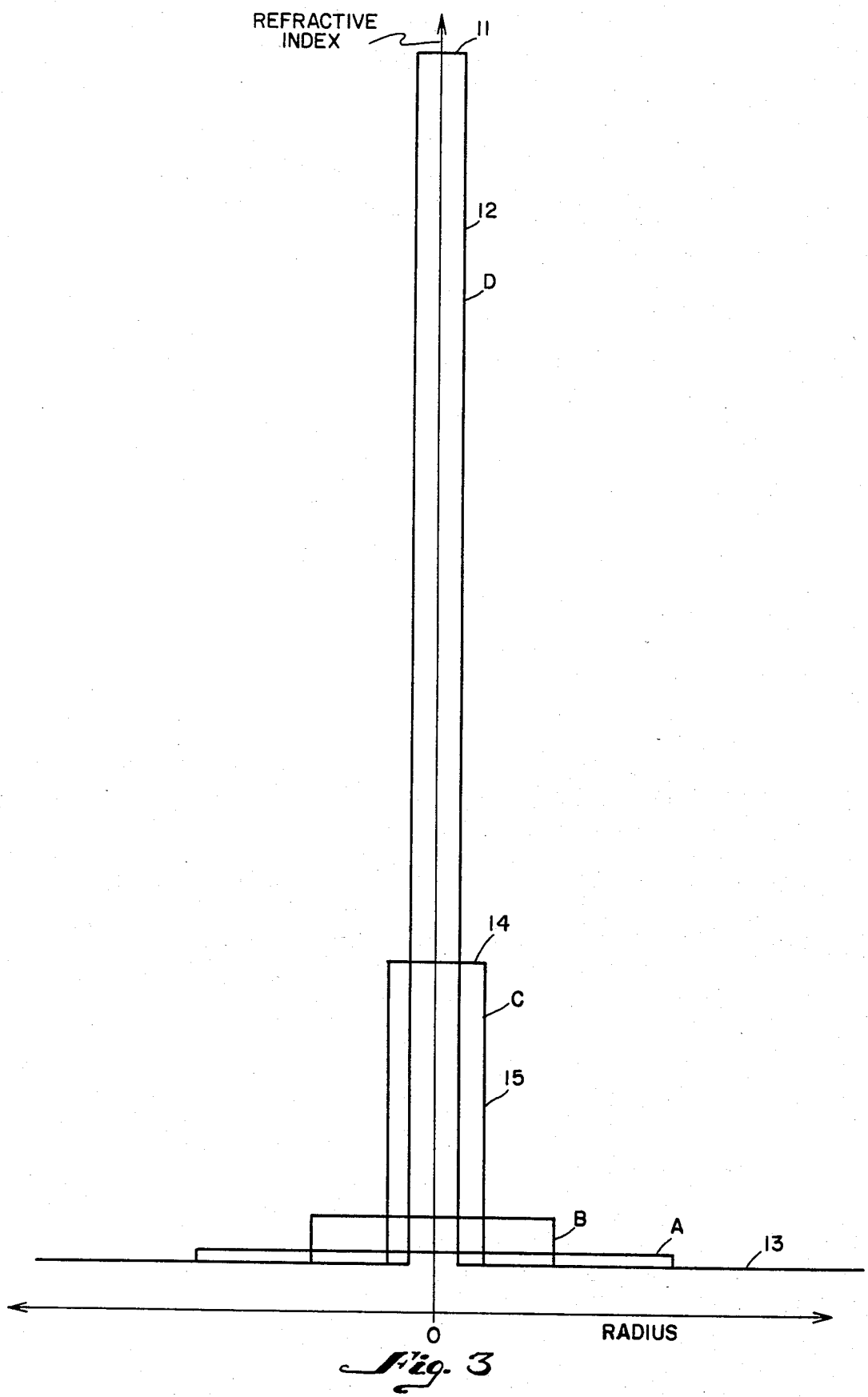
FIG. 3 is a graph showing the refractive index profile at various sections along the axial length of the optical fiber of FIG. 2.

A thermally induced chemical vapor reaction is used for the creation of core material for the fiber because such a reaction is relatively readily controllable, both in the rate of glass formation and in its composition. The reaction may be a hydrolysis reaction, but an oxidation reaction from which hydrogen and hydrogen containing compounds are excluded is preferred because the latter reaction does not produce —OH groups in the final product. Such groups are normally undesirable on account of the position of their optical absorption bands in the near infrared region of the spectrum.

The core material may be built up by the reaction on a bait to produce a self-supporting rod of core material which is then coated with a lower refractive index cladding glass by a similar reaction. Alternatively the core material may be deposited as a layer upon the surface of a rod which is removed after the deposition of a subsequent layer of lower refractive index cladding glass upon the core material. The bore of the resulting hollow structure may then be collapsed as an additional process step prior to the drawing of the preform into fiber. Our preferred method of creating the core material is however to deposit the core material upon the bore of a tube of lower refractive index cladding glass. This tube of cladding glass is not necessarily a self-supporting structure, but may itself be a lining deposited upon the bore of a substrate tube. This use of a lining enables the use of a substrate tube of lower optical quality than would be required if the tube were contiguous with the core, and thus penetrated by a significant proportion of propagating optical energy.

FIG. 1 shows a substrate tube 1 of fused silica having, typically, an external diameter of 10 mm and a wall thickness of 1 mm mounted in a modified lathe (not shown). The ends of the tube 1 are mounted in rotary seals 2 and 3 connected respectively to an inlet pipe 4 and an exhaust pipe 5. The modified lathe is provided with a pair of chucks which are driven at the same speed so that when a short length of the tube is softened by heat, the softened region is not required to transmit torque from the portion on one side of the region to the portion on the other. The inlet pipe 4 is coupled to vapor blending apparatus (not shown) in which a facility is provided for entraining vapors from volatile liquids in individual gas streams which are mixed prior to their delivery from the apparatus into the inlet pipe 4. Control of the composition is determined by flow rates of the respective gas streams and by control of the temperatures of the various volatile liquids. The tube 1 threads a short heater 6 which can heat a short section of about 2 cm of the tube. This heater can be translated up and down substantially the whole length of the tube. Conveniently the heater takes the form of a gas burner having a set of geometrically arranged inwardly directed flame jets.

First a layer of uniform thickness of silica is deposited upon the bore of the tube to provide the lower refractive index cladding material of the completed fiber. This deposition is followed by the deposition of the core material whose composition and thickness varies along the length of the tube. The core material is required to have a refractive index that is greater than that of the cladding glass, and this is provided by codepositing silica with a suitable dopant. Many suitable dopants are possible, including oxides of germanium, arsenic, antimony, indium, gallium, phosphorus and aluminum, used either individually or in selected combination. The silica and the dopants are conveniently deposited by reacting their halides or oxy-halides with oxygen.

The vapor blending apparatus is first used to produce the cladding material by bubbling a stream of dry oxygen gas through silicon tetrachloride maintained at 0° C., and this is diluted with a second gas stream of pure dry oxygen gas. The resulting entrained silicon tetrachloride does not react with the oxygen at room temperature but requires a temperature in the region of 1200° C. Thus the vapor reaction proceeds only in the localized region of the tube heated by the burner 6. At about 1200° C. the reaction produces a powdery deposit which has to be further heated to form a vitreous layer. For this reason it is preferred to use a flame which will take the heated region of the tube to a temperature about 1500° C. at which the silica is deposited directly as a vitreous layer rather than a particulate one. The burner 6 is traversed at a controlled uniform rate along substantially the whole length of the tube so as to build up a cladding layer of uniform thickness and composition. Normally several traverses are required to build up a layer several microns thick.

Using germania as a dopant, the process is then repeated for the deposition of the core material, only in this instance a co-deposition of silica and germania is required, and for this purpose the vapor blending apparatus is adjusted to provide a third gas stream of dry oxygen, this being bubbled through germanium tetrachloride maintained at 0° C. Another difference is that the flow rate of the gas stream through the silicon tetrachloride is not maintained constant, but is varied as a function of position of the burner 6 along the length of the tube. The flow rates through the silicon tetrachloride and through the germanium tetrachloride are held constant along the central core region of the length of the tube, which is typically a meter or more long, but for the first and last 1 to 3 cm of each traverse, they are independently varied to form graded core end regions. At the beginning of a traverse the flow rate of the gas stream through the silicon tetrachloride is reduced substantially linearly, while at the same time the flow through the germanium tetrachloride is increased according to a quadratic function. Near the end of the traverse the flow rates are adjusted in the same manner, but in the opposite sense, with the flow through the silicon tetrachloride being linearly increased, while that through the germanium tetrachloride is quadratically reduced. As before, several traverses will normally be required to build up the requisite thicknesses of core material.

Thus by varying the flow rate of silicon tetrachloride along the length of the tube the thickness of the core is changed. The central core region has a constant thickness while the graded core end regions increase in thickness as the ends of the tube are approached. The variation in the flow rate of the germanium tetrachloride causes a variation in core composition since it provides the dopant. Thus, the central core region has a constant composition while the graded core end regions have a changing composition with decreasing dopant and decreasing refractive index as the ends of the tube are approached.

In the above described embodiment, the variation in the core thickness and composition is realized by variation of the flow rates of the core forming materials while holding the temperature and the burner traversal rate constant. Other methods of varying the core thickness and composition will be discussed subsequently.

In a modification of the above described deposition method the cladding glass layer is not of pure silica, but is of doped silica. An advantage of using a doped silica for the cladding glass layer is that the presence of a dopant in the reaction tends to reduce the temperature at which the deposit comes down as a vitreous layer. Conveniently the same dopant is used for both deposited layers, the dopant concentration being greater in the case of the core material layer.

A further modification also uses a doped silica cladding glass layer, but in this instance the dopant is boric oxide. Boric oxide is unlike other dopants in that it can be used to reduce the refractive index of silica. It is thus possible to construct a preform where cladding material is doped with boric oxide to a greater extent than the core material, and where the doping level of the core increases where the core diameter is expanding.

In each of these instances, once the deposition of the two layers has been completed, the burner is adjusted to give an increased output sufficient to raise the temperature of the heated region of the tube to its softening point. The burner is then traversed along the tube a final time causing its bore to collapse. The balanced drive to both ends of the tube removes any tendency for the tube to twist up during this collapsing process. Finally the collapsed tube is withdrawn from the lathe, mounted in drawing apparatus (not shown), and drawn at a constant rate into fiber. The extension produced by the drawing is chosen having regard to the composition and size grading of the core material of the preform to produce a single mode fiber with a substantially constant normalized frequency lying in the range 2.0 to 2.4.

In the above described methods of forming the core material of the preform the temperature of deposition and the rate of relative movement between the burner and the tube were kept constant while only the flow rates of the gas streams were varied. However since both the temperature and the rate of relative motion affect the deposition rate, the refractive index and thickness of the deposit may be controlled by suitable manipulation involving the variation of either or both of these two parameters.

The particular way in which the variation in core thickness and composition is realized is not critical to the present invention. What is important is that the core thickness be increased as the ends of the preform are approached and that the core composition be varied in relation to the thickness so as to maintain a substantially constant normalized frequency.

Referring to FIG. 2, there is shown a sectional view of an end region of the fiber of the present invention having a core 7 surrounded by a cladding 8. The core 7 is shown having a central core region 9 of substantially constant thickness and composition and a graded core end region 10 where the core is smoothly graded in thickness, increasing in diameter as the end of the fiber is approached. Referring to FIG. 3, there is shown the refractive index profile of the optical fiber taken along Sections A, B, C and D as shown in FIG. 2. In accordance with the calculations set forth in the Summary of the Invention, the normalized frequency V is to remain substantially constant and is approximately equal to a $\Delta n^{\frac{1}{2}}$ where a equals where a equals the core radius and $\Delta n$ equals the difference in refractive indices between the core and cladding material. Cross-Section D, which represents the profile of the central core region, illustrates the core as having a small radius 11 and a high index of refraction 12, with the cladding having a lower index of refraction as indicated by line 13. It is to be noted that the index of refraction of the cladding region remains constant and that only the index of refraction of the core region changes along the axial length of the optical fiber. Cross-section C illustrates that the core radius has increased as illustrated by line 14, with a decreased index of refraction as indicated by 15. The relative changes in the radius and refraction index differential must satisfy the equation $v = a \Delta n^{\frac{1}{2}}$ with v, the normalized frequency, remaining constant. Thus, the parabolic relationship between the radius and the refractive index differential requires a significant change in the refractive index of the core material for a mere doubling of the core radius. In like manner, Sections D and A illustrate the refractive index profiles for Sections B and A shown in FIG. 2. From the above, it is apparent that the core varies in the axial direction of the optical fiber, both in diameter and in composition, so that a parabolic relationship is maintained between the radius and the refractive index differential, resulting in a substantially constant normalized frequency for the optical fiber.

It is to be understood that the foregoing description of specific examples of this invention is made by way of example only and is not to be considered as a limitation on its scope.

What is claimed is:

1. A limited mode optical fiber comprising:
   a cladding layer; and
   a core having a central region of constant material composition and thickness and graded core end regions at both ends of said central region, said end regions having axially varying composition and thickness to provide a substantially constant normalized frequency throughout the length of the optical fiber.

2. A limited mode optical fiber as described in claim 1 wherein the thickness of the core end regions increases as the ends of the optical fiber are approached, and the composition of the core end regions is changed along the length of the core end regions in accordance with the increased thickness thereof.

3. A limited mode optical fiber, comprising:
   a cladding layer; and
   a core having a central region of constant material composition and thickness and graded core end regions at both ends of said central region, the thickness of the core end regions increasing as the ends of the optical fiber are approached, and the composition of the core end regions being changed along the length of the core end regions so that the refractive index of the graded core end regions decreases along the lengths of the graded core end regions as the ends of the optical fiber are approached in accordance with the increased thickness of said core end regions, whereby a substantially constant normalized frequency is maintained throughout the length of the optical fiber.

4. A limited mode optical fiber, comprising:
   a cladding layer; and
   a core having a central region of constant material composition and thickness and graded core end regions at both ends of said central region, said end regions having axially varying composition and thickness to provide a normalized frequency of the optical fiber held within limits which provide the central core region and the graded core end regions with the same set of bound non-radiating frequency modes.

* * * * *